United States Patent
Dani et al.

(10) Patent No.: US 11,507,972 B2
(45) Date of Patent: Nov. 22, 2022

(54) USER PROPAGATED LOCAL MESSAGING SYSTEM

(71) Applicant: Loudscoop Inc., Redmond, WA (US)

(72) Inventors: Nishant Dani, Redmond, WA (US);
Savithri Dani, Redmond, WA (US);
Hemant Puri, Milpitas, CA (US);
Pengpeng Wang, Redmond, WA (US)

( * ) Notice: Subject to any disclaimer, the term of this patent is extended or adjusted under 35 U.S.C. 154(b) by 0 days.

(21) Appl. No.: 16/784,529

(22) Filed: Feb. 7, 2020

(65) Prior Publication Data

US 2020/0258114 A1    Aug. 13, 2020

Related U.S. Application Data

(60) Provisional application No. 62/804,442, filed on Feb. 12, 2019.

(51) Int. Cl.
*G06Q 30/02* (2012.01)
*H04W 4/80* (2018.01)

(52) U.S. Cl.
CPC ..... *G06Q 30/0239* (2013.01); *G06Q 30/0221* (2013.01); *G06Q 30/0236* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 2009/0271289 A1* | 10/2009 | Klinger | G06Q 30/02 705/26.1 |
| 2013/0060640 A1 | 3/2013 | Gadhia et al. | |
| 2013/0179264 A1* | 7/2013 | Wilson | G06Q 30/02 705/14.58 |
| 2014/0012648 A1 | 1/2014 | Grimes | |
| 2015/0264523 A1* | 9/2015 | Xu | H04W 4/025 455/456.3 |
| 2015/0371271 A1 | 12/2015 | Hurley et al. | |

(Continued)

OTHER PUBLICATIONS

F. Alizee Mega, "Everything You Need to Know About Location-Based Mobile Advertising", retrieved from https://www.smaato.com/blog/everything-you-need-to-know-about-location-based-mobile-advertising/, available on Nov. 29, 2018 (Year: 2018).*

(Continued)

*Primary Examiner* — Sam Refai

(74) *Attorney, Agent, or Firm* — Amin, Turocy & Watson, LLP

(57) ABSTRACT

The technology described herein is directed towards a system that provides a user propagated search platform. The system maintains campaign data for offers that when active, are made available to users of the platform. When a user of a (typically mobile) device selectively attaches to an active offer, the user device clones that offer, and as the user device travels, propagates the clone of the offer to other users (their user devices) for potential attachment. Those other users can in turn attach to the clone, to facilitate further propagation. The campaign data, as provided by a campaign producer such as a merchant, can specify various parameters, including location areas for attachment and clone travel, start and end times for a campaign's offer, different zones that can control different clone-related actions, and incentives for a user to attach to and propagate a clone of an offer.

20 Claims, 11 Drawing Sheets

(56) References Cited

U.S. PATENT DOCUMENTS

| | | |
|---|---|---|
| 2015/0379552 A1 | 12/2015 | Kent et al. |
| 2016/0005079 A1 | 1/2016 | Courtney, III et al. |
| 2016/0026754 A1 | 1/2016 | Kohane et al. |
| 2016/0267541 A1* | 9/2016 | Breakey ................. G06Q 50/01 |
| 2017/0068984 A1* | 3/2017 | Joshi .................... G06Q 20/045 |

OTHER PUBLICATIONS

International Search Report and Written Opinion for International Application No. PCT/US2020/017530 dated Jun. 16, 2020, 15 pages.
International Preliminary Report on Patentability for International Application No. PCT/US2020/017530 dated Aug. 26, 2021, 8 pages.

\* cited by examiner

USER PROPAGATED LOCAL MESSAGING SYSTEM

CROSS-REFERENCE TO RELATED APPLICATION

The present application claims priority to U.S. provisional patent application Ser. No. 62/804,442, filed Feb. 12, 2019, entitled USER PROPAGATED LOCAL MESSAGING SYSTEM, the entirety of which is hereby incorporated by reference.

BACKGROUND

People (users) and other entities such as merchants, event organizers and the like both benefit from the users being able to decide on and find desired products, services, scheduled events and so forth. Conventional search models often fail in this regard.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
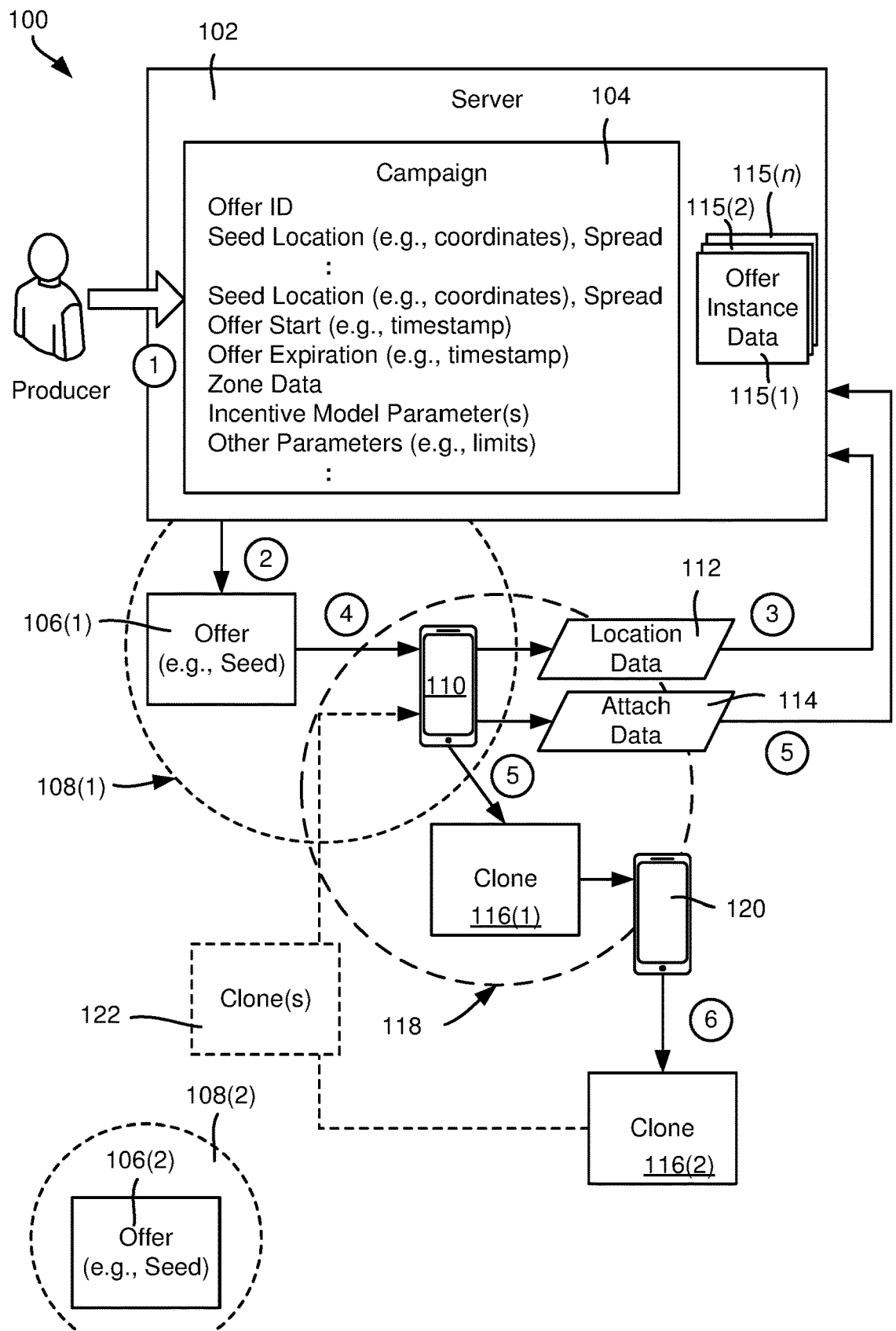
FIG. 1 illustrates an example system and operation flow that facilitates a user propagated messaging system, in accordance with various aspects and embodiments of the subject disclosure.

Various aspects of the technology described herein are directed towards a user-propagated local search platform. The technology redefines conventional local search models in significant ways by creating an integral active role for local users in the discovery and ranking process of search results. In one or more implementations, described is a technology that provides a platform to spread offers, comprising units of information, including, but not limited to breaking news, product and brand marketing, local events, funding events, product discounts, happy hour events, polls, digital assets such as applications, video and music, and many other local services. These can be referred to as "offers" to signify that it is an offer to attach to a unit of information and carry that unit of information.

Aspects described herein are directed towards a technology by which users propagate (typically local) messages, including messages regarding businesses and activities (e.g., sales campaigns) related to businesses, and other activities such as events. The act of users coming together and exposing their intent, even anonymously, creates a powerful crowd-verified model for search results, which is unlike any other known search model. The search model's search results are the cumulative result of the actions of users, and campaigns are able to use an incentive model to influence user participation.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

In one aspect, one approach provides a different kind of search, where users actively participate in defining the ranking order and presence of search results based on what they carry and where they move. The platform integrates what is traditionally separated out as algorithmic search and paid search, in part because the users that help build up the algorithmic search results are influenced by participation (often paid) incentives that are offered by a campaign.

More particularly, as generally represented in the example system 100 of FIG. 1, an offer is introduced in a search platform (e.g., of a server or group of servers 102) using a campaign 104 that helps to define how the offer is spread; this is represented in FIG. 1 by the arrow labeled one (1). More particularly, the campaign 104 comprises data that specifies the offer, the locations where the offer can spread, the lifetime for which the offer exists, the incentive model for user participation and spreading of the offer, the spreading options, and how the offer is seeded into the system to allow the offer to be discovered by its early adopters. In this way, the campaign such as the campaign 104 sets the structure around the offer to allow it to be spread. The offer exists within the lifetime of the campaign 104. Note that the campaign data can be maintained in any suitable data structure or set of associated data structures, such as maintained in a repository, data store or the like.

For purpose of explanation, the creator of a campaign can be referred to as a "producer" and the "user" can be the person propagating the campaign by attaching and carrying the clone. This in no way limits the creator of the campaign to be necessarily a producer, but rather is used herein to make it easier to distinguish between the creator and the user of the campaign, and does not limit who the real creator is. Indeed, it is expected that many campaign creators will not be producers, but instead can be retail or wholesale merchants, online stores, mobile and web application developers, election campaigns, stay-at-home parents, professionals, service people, retail showrooms, and/or event creators and organizers. This above list only provides some non-limiting examples, and is not intended to be exhaustive of the types of people that will find a way to create a campaign/use the product to create a campaign. It should also be noted that the same person might simultaneously be a user of one campaign and a producer of another.

In one or more implementations, the campaign 102 can "kick-start" the spread by distributing the offer at seeded locations (arrow two (2)), whereby the offer can now exists at multiple locations simultaneously. Each of these simultaneous offers can be referred to as a seed; (note however that in alternative implementations, different seeds/location areas can correspond to different start and expiration times, which need not be simultaneous or even overlap in time). This is represented in FIG. 1 by the offers (seeds) 106(1) and 106(2) and their location areas (dashed circles) 108(1) and 108(2), respectively. Each location defines the spread for that particular seed, which can be a geographical boundary or a location area where the seed can be discovered by other users. If a user, such as represented by the mobile device 110 in FIG. 1, enters one of these location areas, the user can discover the seed and clone the seed 106(1). Note that the mobile device 110 in FIG. 1 is running an application program or the like that regularly provides its current location data 112 to the server 102 (arrow three (3)), such that the server knows whether or not the mobile device 110 is in one or more location area(s), and if so, which location area or location areas.

Figure 2:
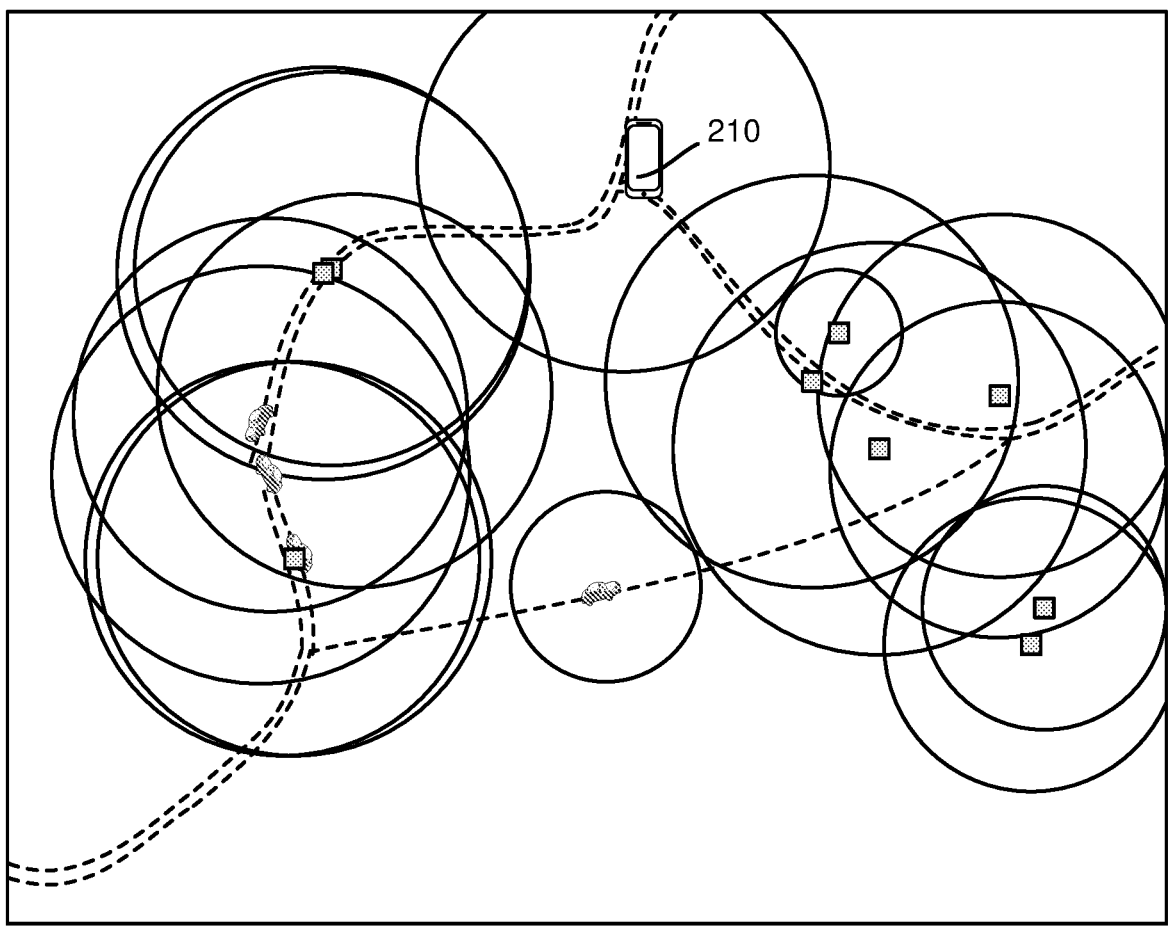
FIG. 2 illustrates an example of devices attaching to offer seeds and propagating clones of the offers, in accordance with various aspects and embodiments of the subject disclosure.

At any point in time, a user can attach to and carry one or more offers, such as via interaction with the mobile device 110, as represented in FIG. 1 by the arrow four (4)) and the "attach" data 114 sent to the server 104 (arrow five (5)). Once an offer gets picked up from a seeded location, the offer gets a life of its own as other users discover and propagate that offer. For example, FIG. 2 shows how seeds (shaded blocks within circular areas) can be attached by user devices and distributed as clones, shown as vehicles and the mobile device 210 with relocated circular areas.

This offer attaching and clone information can be tracked at the server 104, such as represented by the offer instance data 115(1), (and other offer instance data 115(2)-115(n) for other offers). Note that such data structures can be in any suitable format, and can track the clones, e.g., which user device(s) have attached to the offer and are carrying a clone, their locations, and so forth. To this end, when a user clones one of these seeds, (arrow five (6)), this clone 116(1) assumes a life of its own. This clone moves with the user, as represented via dashed circle 118. One or more other users, such as represented via the mobile device 120, can now discover this clone 116(1) (or one of the original seeds), as represented via arrow six (6). The other users in turn can create new clones that move with them, such as represented in FIG. 1 by the mobile device 120 creating a new clone 116(2). Note that the user/mobile device 120 can also make available one or more of its clones 122 to other users, such as the user represented by the mobile device 110.

Thus, the offer either exists as a seed or as a clone, and there can be many of these seeds and clones as the campaign progresses. The number and distribution of seeds is usually defined as part of the campaign. The number of the clones is dependent on how many users clone the offer, and the distribution of clones is defined by how users are moving with their clones; (the campaign can set limits for cloning).

When users attach and carry an offer, such an action improves the offer's geographic ranking, and the offer begins to show up in other user feeds as well. As more users attach and carry an item, the item acquires a viral quality and begins to spread. As users move and change locations, the shape of the spread also changes. Users are thus actively influencing the search results seen by other users as they move from location to location. Also, as users move, their search feed changes as they discover other content that is being carried by other users in their new areas. Intrinsically associated with the technology described herein is an optional incentive model that helps to motivate users to participate and to attach and carry offers.

To summarize, when a user attaches to a campaign (via a seed or clone), the attaching indicates that the user is interested in participating in the associated offer. A clone can be automatically created when a user attaches to a campaign. Users can 'attach' or 'detach' clones one or more times over the lifetime of the campaign. When a user attaches a clone, the offer associated with the campaign begins to propagate with that user. Thus, a campaign breaks off into one or more clones which then move along with the users who carry them. Users can clone directly from the campaign origination through an action referred to as attaching to a campaign seed. Alternatively, users can clone from other users. In any event, the new clones that are created can have a similar behavior on how they spread.

Figure 3:
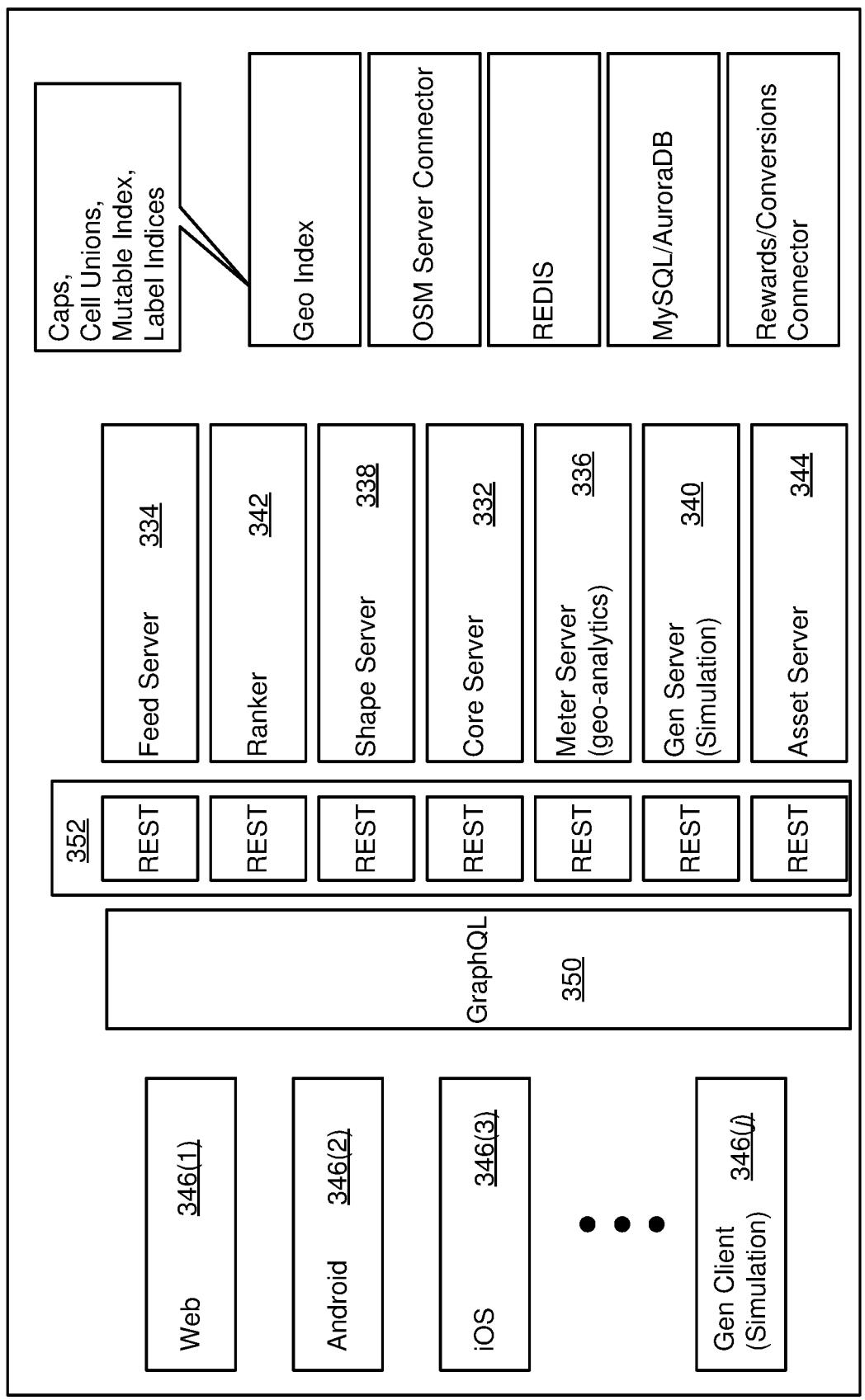
FIG. 3 is an example representation of an architecture of a system that facilitates a user propagated messaging system, in accordance with various aspects and embodiments of the subject disclosure.

FIG. 3 depicts an example architecture for the system 100. In this implementation, a core server 332 wraps a repository for the campaigns and the clones, such as the campaign 104 and offer instance data 115(1)-115(n) of FIG. 1.

A feed server 334 tracks geolocation for the users (user devices) and handles user device (and if needed producer-generated) queries about nearby clones and campaigns, such as queries sent via corresponding applications running on the user devices. A meter server 336 can provide real time and batch analytics. A shape server 338 connects to a backend geo database and serves queries related to shape geometry, e.g., for cities and states. The gen server 340 acts as a simulation server to run real life simulations.

A ranker 342 as described herein processes data for ranking. An asset server 344 manages asset data.

The system can be accessed through a combination of Rest APIs and GraphQL API. For example, in FIG. 3, user device platforms 346(1)-346(j), (which includes a Gen client

346(j) for running simulations in conjunction with the gen Server 340) interface with the GraphQL API set 350, which in turn communications with the servers via REST APIs 352.

Figure 4:
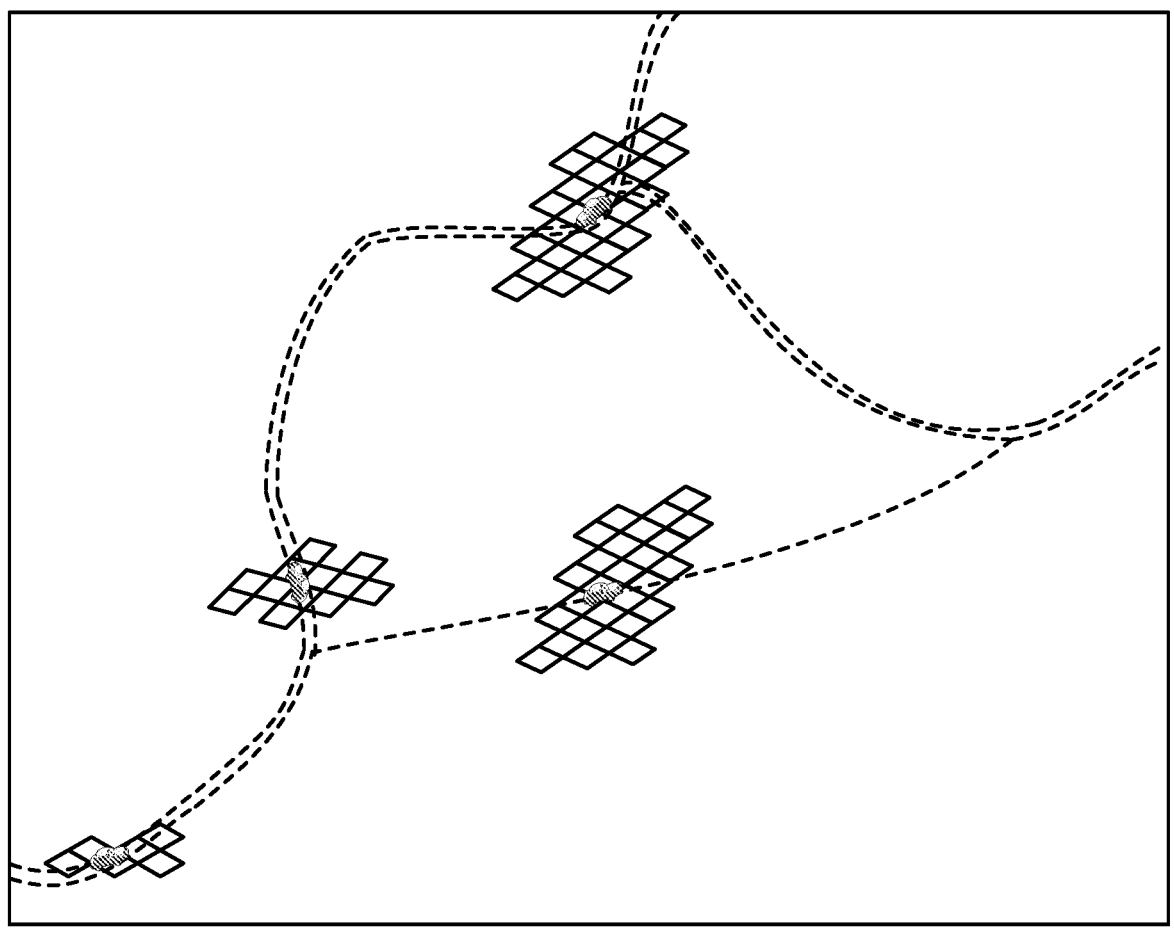
FIG. 4 is an example representation of meter server analytics that show shows the spread for a campaign, in accordance with various aspects and embodiments of the subject disclosure.

FIG. 4 exemplifies aspects of the meter server analytics. More particularly, FIG. 4 shows the spread for a campaign. The small tilted squares show the real time spread from the clones that have attached to s campaign. As can be seen, as the clones move, the squares cover increasing amounts of area.

Figure 5A:
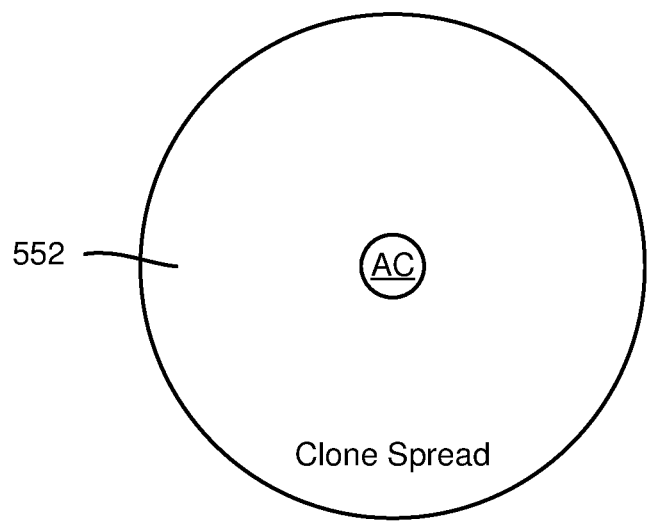
FIG. 5A is an example representation of a clone spread of an attached clone, in accordance with various aspects and embodiments of the subject disclosure.

As represented in FIG. 5A, clones have a spread that is defined when the campaign is set up. The spread determines the circle (or other area) of influence around the user where the offer will be visible to other users. An attached clone (AC) is shown as having a clone spread 552. While a circle is generally the most common spread, the platform described herein facilitates the use of other shape spreads as well, including but not limited to regular polygons, ovals, polyhedral (if altitude), as well as irregular shapes.

With respect to clone attachment concepts, users typically detect clones from other users anonymously. A user picks up a clone due to proximity with other users, even though they are unaware from which user they might be picking the clone. Notwithstanding, the technology provides for a "swipe" feature where users physically can bring their mobile devices close to each other, and, using barcode or other QR codes or the like, a user can scan one or more clones from the other user, and vice-versa. The act of swiping further can create a relationship between these users that the system can persist and track and later use to improve clone discovery and ranking. For instance, a feed ranker 342 (FIG. 3) component as described herein can rank higher the clones of those users that have previously exchanged a clone using the device swipe. The information on how and who from a user obtained a clone (e.g., via anonymous proximity or by intentional physical swipe attachment from a known clone participant) can be sent as part of the attach data 114 (FIG. 1). The user feed ranker 342 thus is part of the system 100, that is, in one implementation, the system (including the user propagated local search platform) has a ranker 342 that decides how to rank the clones or campaigns that are close to the user location, and present a ranked list of clones to the user so that the user's attention and time can be effectively used. The ranker 342 can be optimized to achieve the goals of campaign objectives and maximize the attach rates on the results feed. The ranker 342 can support different campaign objectives by taking different approaches to filtering and sorting of relevant clones visible to the current user location.

Via the swipe concept, the system 100 thus facilitates building a local graph. When a user A that has a clone swipes it to B, this is not an anonymous pick up from the air, but rather is a physical swipe using an e.g., QR or similar code or using BLUETOOTH or similar beaming protocols. There is established a real, non-anonymous relationship that the system can track to build a local relationship graph. Unlike other clone attaches that are anonymous, this attach is not anonymous. In this way, whenever people spread the clones using a physical or similar proximity-based swipe, they will build up a local relationship and following. Over time as more and more users swipe with others, they will have assembled a local user graph. Thus, in one or more implementations, the swipe allows discovering and remembering a real physical relationship. A local graph is a graph that is built up purely using one or more means of physical attach, unlike digital graphs that one can build using social media sites.

The ranker 342, knowing this relationship, can use this as a feature while building the search results for the user. If there are two competing clones from the same campaign, the ranker 342 can show the clone that has the closer physical relationship between the two users, if it believes that this will help increase the likelihood of an attach. The ranker 342 can show the user identifier against a search result if it similarly believes that it would increase the likelihood of an attach. Further, this can improve the ranking of such clones.

Users can also share offers through a one-to-one technology such as provided by the WHATSAPP mobile messenger application, email, group chat, etc. This facilitates driving application adoption using the existing contact list of users and allows more highly networked users a way to gain incentives faster. However, when a user receives an offer, in one or more implementations the platform checks whether the offer is in a valid campaign zone; if not the offer is kept on hold, that is, the offer gets activated only if the user enters into one of the valid zones during the life of the campaign. This allows maintaining a geographic focus, yet provides users with the flexibility to spread offers through their contacts.

Seeding can be based on zones. More particularly, when a campaign is initially established there are no users carrying it. The campaign is first seeded by specifying zones where it is available for its initial adopters. A campaign can have multiple zones that allow the producer to tune the geographic availability of the campaign. There are options for defining a zone's boundaries. Zone boundaries are usually some combination of geometric boundaries or local administrative boundaries. Zones can be based on the fact that users in different zones respond differently to distance from a producer, and the producer may need to vary the incentive structure for these campaigns. Some producers who have no specific locations like online entities or application developers may opt not to use distance from a fixed location for zone definition, but simply pick zones according to their campaign objectives. The campaign is allowed to set different campaign parameters for each zone. These multiple zones allow a producer to differentiate between geo-located users and the regions where the campaign will be available or not.

In sum, a typical campaign can have multiple zones, and each zone can have a shape and also its own parameters (e.g., expiration time). Zones can either be local or geo. As described herein, local zones are those that are defined as a distance from a merchant location. As a result, a local zone could have a geometric shape that is parameterized by distance to a physical location, usually a merchant store, a meeting location, a stadium or similar place that is central to the offer. Geo zones (geographic zones) are those that are defined based on administrative boundaries like city, county or state boundaries and in general are not defined by distance to a location.

Users typically encounter campaigns when they move within a zone or transition from one zone to another. Users help to spread the reach of the campaign by taking its clones to outer regions and geographical areas.

Figure 5B:
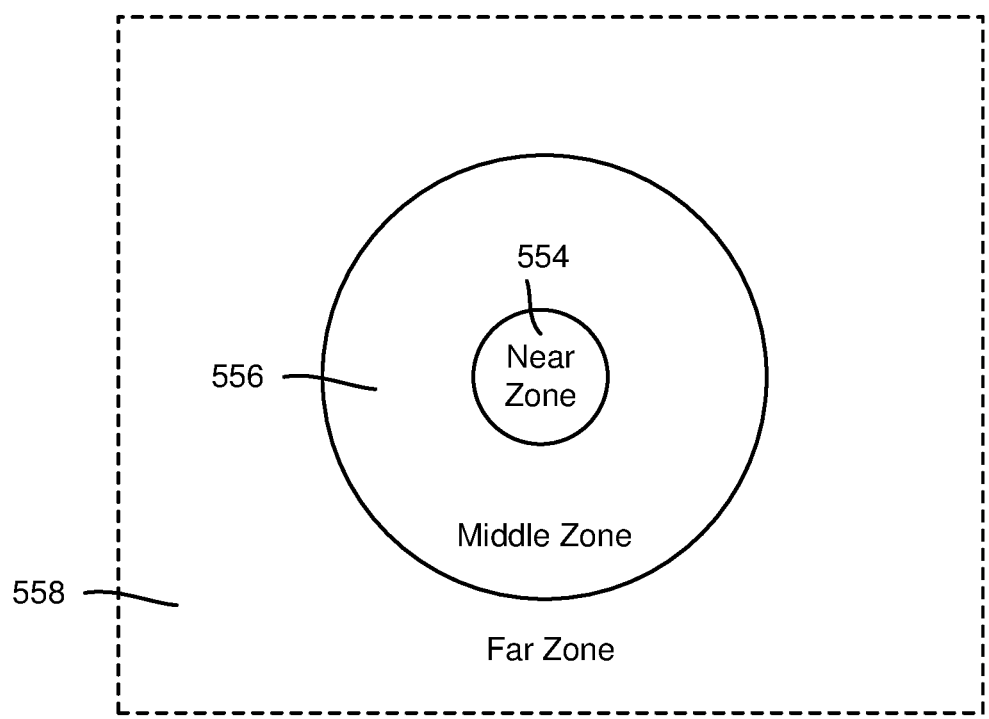
FIG. 5B is an example representation of a different zones of a campaign, in accordance with various aspects and embodiments of the subject disclosure.

With reference to local zones, when a campaign targets a physical location or service, the campaign producer can, for example, select two concentric circles that are centered around a physical location. As represented in FIG. 5B, these separate out into a near zone 554, a middle zone 556 and a far zone 558. In the example of FIG. 5B, the middle zone 556 is shaped like a donut. Thus, the near zone 554 and middle zone 556 can be geometric, and which zone a user is in can be determined by the user's distance from a central location.

Geo zones are generally intended for digital or national campaigns in which there typically is no distinct single physical location. Instead, the seeding can be based on one or more geo zones, where the geo zone can, for example, be the boundary of a city, a neighborhood, a county, a state or other administrative region. There is no restriction that a geo zone be close to where the originator of the campaign is located. This allows, for example, national agencies to reach and formulate national marketing strategies.

With a geo zone, there is no particular physical location, but rather one of likely many locations where the campaign is run simultaneously. The geo zones can thus take administrative shapes corresponding to city or state boundaries.

Figure 6:
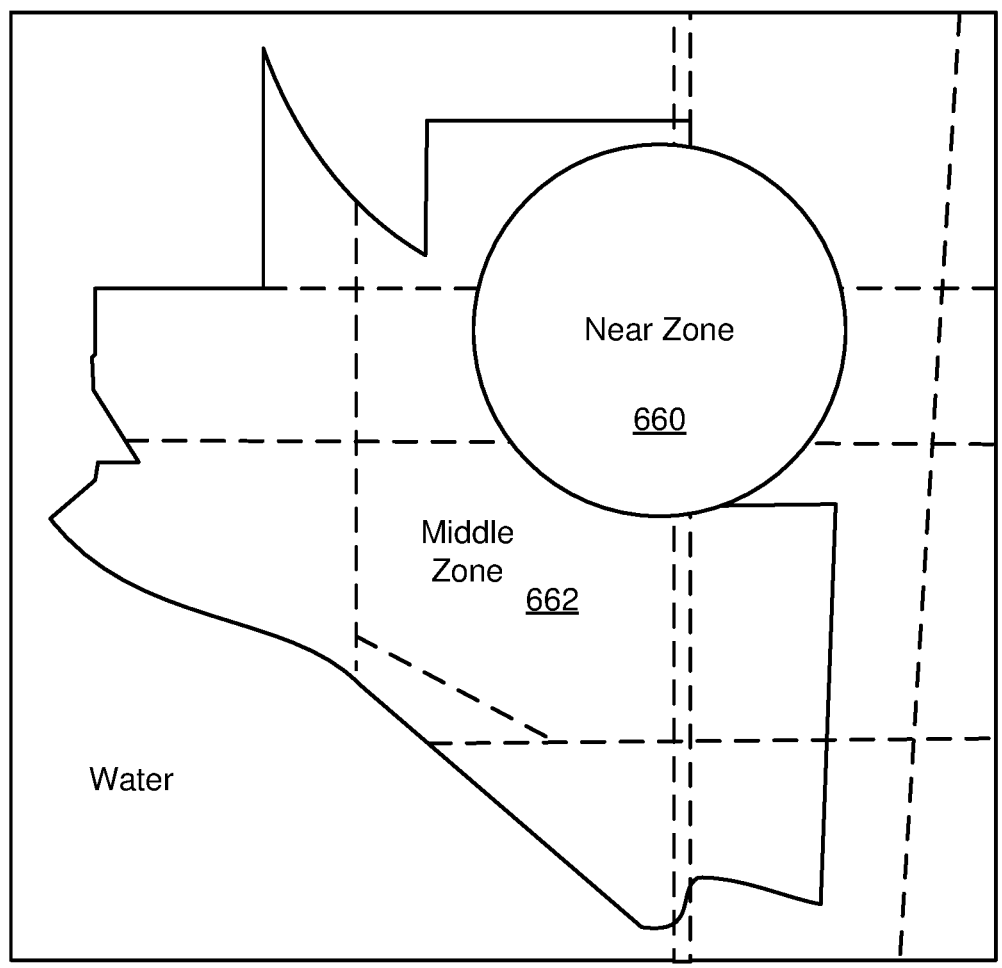
FIG. 6 is an example representation of a mixed near zone and geographic zone related to a campaign, in accordance with various aspects and embodiments of the subject disclosure.

Mixed zones refer to a concept in which a producer can define a near zone as a circle (or other area) and the middle zone as an administrative region, e.g., a neighborhood, city, county, or state. The near zone is typically close to the producer, possibly a few blocks away, and targets local users who are already in the neighborhood. A user in the near zone has to incur less travel costs and time to get to the producer. FIG. 6 shows an example of a mixed zone comprising a circular near zone 660 and a neighborhood-boundary determined middle zone 662, that is, the near zone is geometric, while the middle zone corresponds to a geographic area. Note that in FIG. 6, the solid lines within the rectangular block define the zones 660 and 662, while the dashed lines represent roads or the like.

A zone can have a shape attribute that describes the shape of its perimeter. For instance the near, middle and/or far zones can be described using concentric circles, but other combinations of shapes are also possible. For instance, both the near zone and the middle zone can be an administrative region. In one or more implementations, if there is overlap, by default the middle zone excludes the near zone, although this can be set differently. A near zone is optional, and thus a campaign can decide to have only a middle zone. There can be multiple near zones, middle zones and/or far zones.

The use of zones allows campaigns to create different offers for differently located users. If there is only a single zone present, there is only a single set of campaign parameters. A campaign can also have two zones without any offer for the near zone. A producer decides on his or her zones based on where they see the most potential for drawing traffic or the arrangement they believe will maximize campaign objectives such as reach, conversions, revenue or return on investment. The far zone is the region beyond the middle zone, and while a producer can exclude far zone users entirely, it can be alternatively useful to a producer to spread their offers to the far zone, e.g., if they are already saturated in the near and middle zones.

While the zones initially define the area for spreading, they can also be used to define other zone-specific parameters and incentives. This means that while initially the seeds can be available by zones, subsequent cloning behavior can also be impacted by zone parameters. For instance the clone spread can vary by zone. The producer can disable cloning entirely in certain zones; such as the near zone or the far zone, to exclude certain geographically located users from picking up the campaign.

The producer can offer some incentives to encourage the user to propagate the offer to the far zone and make new users aware of the offer. Often the area outside the far zone has no seeded clones until a user with a clone moves into these areas. Thus, the offer tends to spread virally as users travel to the far zone and this helps to increase the offer spread.

A near zone can be an exclusion zone. For example, a producer corresponding to a business (e.g., a store) can decide not to target any offers for the near zone, because they believe that the foot traffic close to the store's location is already likely to come to the store, without the need of additional incentives. This creates an exclusion zone around the location, e.g., where no discounts are available. In this case the producer only offers incentives as a way to encourage people that are far away to come to the producer's location.

Zone-based campaign parameters can be set by the producer, such as to set different campaign parameters on the near zone and on the far zone. In the near zone, there can be different parameters that influence for what the producer is willing to optimize. Such users are already close the producer, so the producer can decide that the campaign does not need to offset the effort users would otherwise have spent to come into the near zone. However, the producer can still decide to offer a discount to encourage traffic based on competing with other producers that are close by. Thus, each producer can incentivize the near zone for an objective.

Flexible zones for a producer are available. Typically a producer certifies the physical location of a store or business or service or office. In this way, producers have natural zones around such locations where they run their campaigns. As a result, a typical user-propagated local search platform campaign originates at a fixed physical producer location. That influences the campaign structure and the way that incentives (e.g. discounts) are placed on the campaign.

Some services, though, can prefer to have a flexible location from where they run their campaign, and it is generally not possible to certify this location, as it would vary to the point where the producer plans their projects. By way of example, consider a plumber who has already spent resources (gas, time and other costs) to come to a location. The plumber can save both valuable time and money by having a campaign for local users in the neighborhood of their current project. The plumber can be matched up with people who need emergency plumbing services, for example, and are best served by a plumber that is already in the location. This flips the service model, where a service goes to a location and does multiple jobs in the same location before moving to another location. It also applies to jobs that homeowners have delayed because they did not have the time or the desire to undertake the expense to get it done. The sudden presence of a local incentive can enthuse the homeowner to avail of the campaign. For example, if a plumber has a preplanned job at a specific time, the plumber can float an offer or incentives for those that are nearby, which can amortize their fixed travel costs across multiple jobs.

There is a structure of incentives that a producer can offer a user to propagate a clone. The incentives can be based on the marketing objectives of the producer and what the producer intends to accomplish with the campaign. The incentives can also influence the users that attach and carry the campaign. For the most part the producer is free in how they use the incentive model, including whether there are any incentives at all.

A producer can offer incentives for attach and limit the incentives with a per-user cap. The producer can provide the user incentives for each attach, and can set an upper limit or per-user cap on how much the incentives can accumulate for a single user. For example, the producer can decide to spread a lot of smaller discounts to a large number of users, but not large discounts to a few users. This can be desirable for small ticket items where the objective is to maximize the foot traffic or total amount of sales. To achieve this objective, the producers use the per-user cap. Having a user cap can help increase market reach, since it will prevent campaign cap rapid exhaustion by just a few users.

Not having a cap per user, but creating a campaign cap, has another effect in that it creates an immediate buzz and a "gold rush" like effect. Because there is no cap, some highly committed users are more likely to rush out to push the campaign to maximize their incentives. This can create a competition among users who try to maximize their share of the limited campaign budget. Due to their efforts, a campaign spreads rapidly, and in a very short time it can achieve its budget. On the other hand those producers that want to maximize conversions would likely want to cap the discount offered to any one user.

Even if a user is capped, the platform still provides a desirable geometric progression. For example, if a user gets capped at 10 attaches, the producer still achieves a geometric progression on attaches of 1, 10, 100, 1000, etc., in multiples of 10.

Often producers can offer carry incentives as well. A carry incentive is credited when a user is carrying a clone and this clone shows up on the search feed of another user who is in their proximity. The user gets credit for this clone showing up, even if it fails to be attached. Producers have different reasons for offering carry incentives; for example, they can attract a wider set of users to their campaign if the users are allowed to accumulate lots of smaller credits more often rather a few large credits less often. Carry incentives also have gamification-like benefits, in that they give small incremental points to the users which can keep their enthusiasm high by providing constant motivation.

The system can discourage pyramid effects that can cause undesirable characteristics. In pyramid effects, a user can get rewarded when users who have attached their clone get an attach many levels further down from an initial attach. However, there can be some game-like excitement about unexpected second level attaches, which can happen at locations distant from a user. To encourage such excitement, one implementation offers a two-level scheme, where attaches two levels down get a user a smaller benefit. This brings in users that have a larger spread value, and a second-level attach is usually priced at a fraction of the first level attach. For instance, merchants can have the option of whether to have a second level attach at all. If they do have a second-level pricing, they could use a system suggested pricing or specify their own.

The system offers a natural adaptive velocity spread, wherein a velocity spread refers to the concept that a user traveling should not be overly influencing the search feed of users that are at rest. This can lead to a lot of undesirable effects, such as accidental or incorrect attaches and even the potential for spam from moving vehicles. More particularly, this is accomplished via a velocity spread. As a user travels, the system tracks the velocity and direction of the traveling. This allows the system to manage a velocity adaptive spread, which in general means that others that are traveling in the same direction will see the clones in their feeds, but it will not be shown to people that are not moving similarly. However, the converse (the traveler sees the clones) can be allowed, because as a user moves, they are expected to pick up search offers from the neighborhoods through which they will be moving.

The system can be naturally resistant to bot-like spam, as a user cannot influence a region outside the user's reach. A user has to physically be in a location to spread the offer to others nearby. When a user moves, the clone moves with the user. Thus, the level of spam in a user propagation system is far less than online spam. The system demands physical presence or colocation in order for an offer to be available. As the user helps other users attach to clones they are carrying, the user gathers points defined by the incentives on the campaigns. However producers can require that the points will convert to real currency only when the users themselves convert. Thus, users have little motivation to accumulate points for offers that they have no intention of converting. This itself will likely serve to reduce spam because there is no incentive for users to carry offers that they have no intention to convert. And if they convert (say buy) an offer, the converting action identifies them as genuine users and not bots.

While most users will carry the clones without modification, a producer can offer a way for the user to improve the spread (and possibly increase their incentive) by adding in photos plus media that show the user personally interacting with the product. Such adapt-and-carry concepts can improve the chances that other users will attach to the clone, because its content is personalized. As other users attach to the clone, they can add their own adapt media.

In this way, a clone can stars carrying more and more media as more and more users participate in the adapt. If there are two identical clones the system can use the adapt-and-carry responses to decide how to rank them. Additionally the system can have users doing a "like" response to adapted media, which also is beneficial in encouraging users to do an attach.

Figure 7:
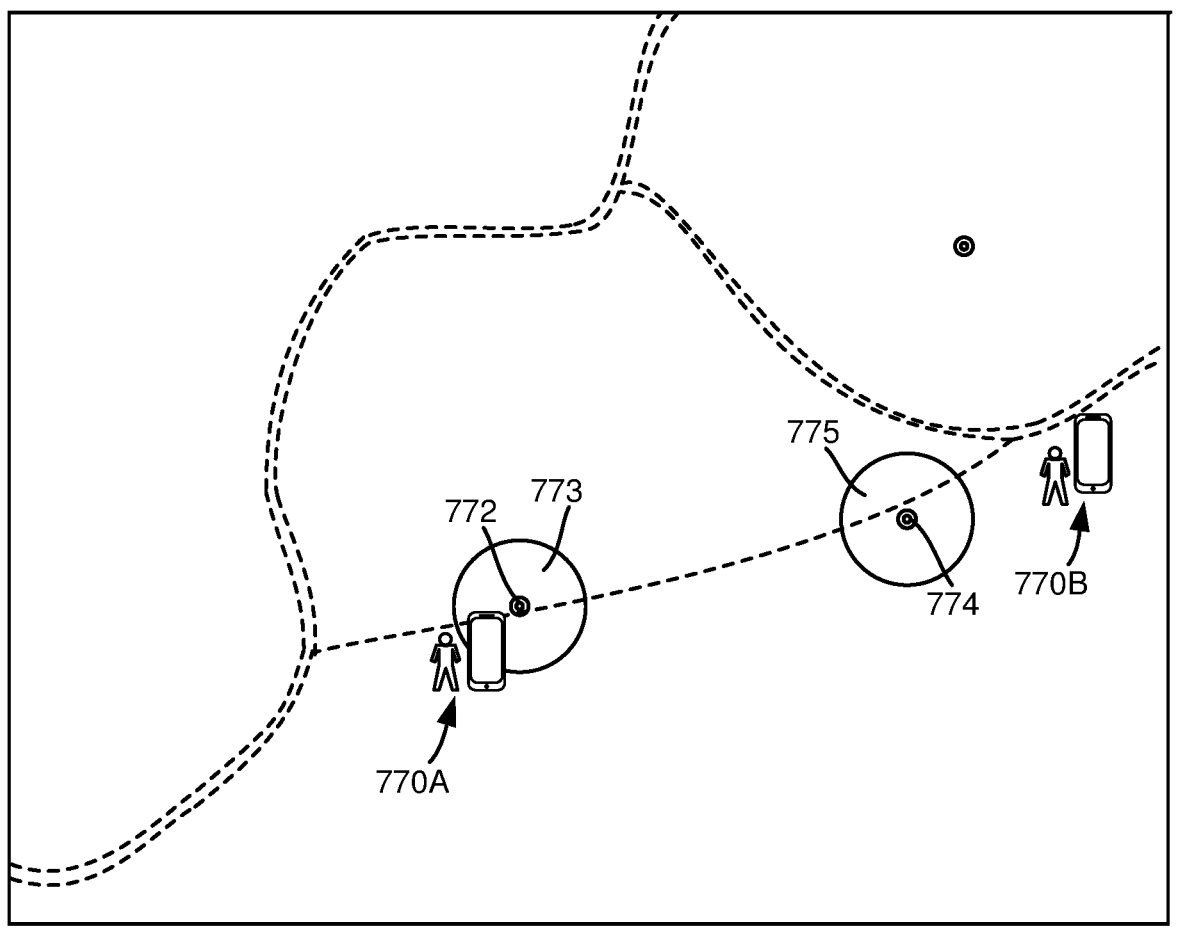
FIG. 7 is an example representation of sticky clones associated with a user, in accordance with various aspects and embodiments of the subject disclosure.

Sticky clones are another concept, such as represented in FIG. 7. Consider that a user/device 770A (at time A) goes to a location but cannot spend much time there, as the user is moving to another location 770B (at time B). If desired, a user can stick the clone to a spot such as 772 with a suitable surrounding area 773 where the user thinks she is likely to get more attaches. This stickiness can last only for a limited time (e.g., four hours) before the clone disengages back to the user's current location. The user is not limited to a single sticky clone, and thus can stick another clone to another location, such as shown as location 774 with a suitable surrounding area 775. It is also feasible to allow a user to stick the same clone to multiple locations, such as via a sticky clone count limit in the campaign data.

A sticky clone has benefits in that it keeps the clone longer at a location than the user. In this way, the user will not be penalized for the lost opportunity of being at a desirable spot, but simply not having enough time to get an attach. The sticky clone can have only a half radius of influence, and thus balances out the advantage of stickiness. When the clone is sticky at a location, then it is not traveling with user. Instead the clone begins to travel with the user only when it is disengaged from its sticky location. This can be an attractive feature for the user, in that they can plan out a more intelligent strategy to obtain higher discounts or the like. Note that it is feasible to have a sticky clone remain at a location that the user has not actually gone to, such as by identifying coordinates; it is also feasible to have a semi-sticky clone that moves relative to a user device, e.g., at some distance behind the current user device location, or follow at half (or some other percentage of) the user's speed, and so forth.

Using augmented reality for sticky clones is available. A producer can use augmented reality to place a clone at a particular physical location, like sticking it to a door. Then, users have to make the effort to discover the clone using augmented reality. This makes it more difficult yet more interesting to discover the clone. This can particularly be desirable for seeded clones, by creating a POKEMON-like behavior where people will see other users trying to discover a clone, which will create awareness and buzz around the particular campaign. If others see people moving their phones trying to discover a clone, it creates unexpected buzz around the campaign and is an additional way to compete on its marketing.

The core of campaign pricing is that the platform asks the producer to pay for geographical spread. This spread can be size of the near zone, the size of the middle zone and/or the size of the clone spread. In general, larger areas or spreads are priced more, although population density can be a factor as well.

Returning to aspects of ranking, some illustrative examples are listed below:

1) If multiple clones for the same campaign are in range, the ranker 342 (FIG. 3) can optimize them so that users who have lower accumulated credits show up higher and get a chance to be attached. This optimizes for the producer who wants to spread smaller incentives to a larger number of users.

2) The ranker 342 also can prioritize sticky clones lower, so that physical presence at a location is rewarded (and also reduces the likelihood of spam). Conversely, sticky clones could be prioritized higher if the ranker 342 wishes to reward planning and foresight of the user.

3) For ranking across clones, the ranker 342 can take into account how near the campaign is to the user, but also can consider by how the user's historic attach vector is correlated to the clone user's attach vector. The clones that come from users that share similar attribute vectors are more likely to be attached as against clones from dissimilar users. Attribute vectors can, for example, maintain historical attach rates, detection of user intent, and other ways to classify users.

Another aspect is clone selection. If there are multiple clones of the campaign that have a similar ranking, the ranker 342 has different options available. The ranker 342 can pick a single clone randomly, can spread the incentives among the contributing clones or can could use other mechanism to decide which clone has maximum attach likelihood of attach. The ranker 342 can show a clone that has the most revenue benefits, the most return on investment to the producer, or can de-rank clones that are further away. The ranker 342 can also look at the popularity of the adapt-and-carry chains to decide which clones have a higher likelihood of attach. Typically the ranker 342 will use some combination of these measures to decide which clone to show and which clone benefits from the attach. It benefits the user to propagate their clones in those locations where there is less competition from other clones of the campaign. The ranker 342 also can look at parameters such as overall attach rate as a measure of hotness or desirability of a campaign, and can use that for predicting attach rate.

Producer analytics are another aspect. Because of the way of spreading clones, the system provides producers with likely critical insights into how their campaigns are popular in a geographic area and by neighborhood or other administrative areas. This can be particularly useful for producers that are managing an election campaign budget, for example, to decide where to allocate additional volunteer time or further marketing spend. One of the benefits of the user propagated local search platform is that it facilitates a way to measure and track how the buzz and adoption for a particular offer is spreading. Thus both the time and space dimensions of how a campaign originates and spreads across one or more geo-areas are covered.

Figure 8:
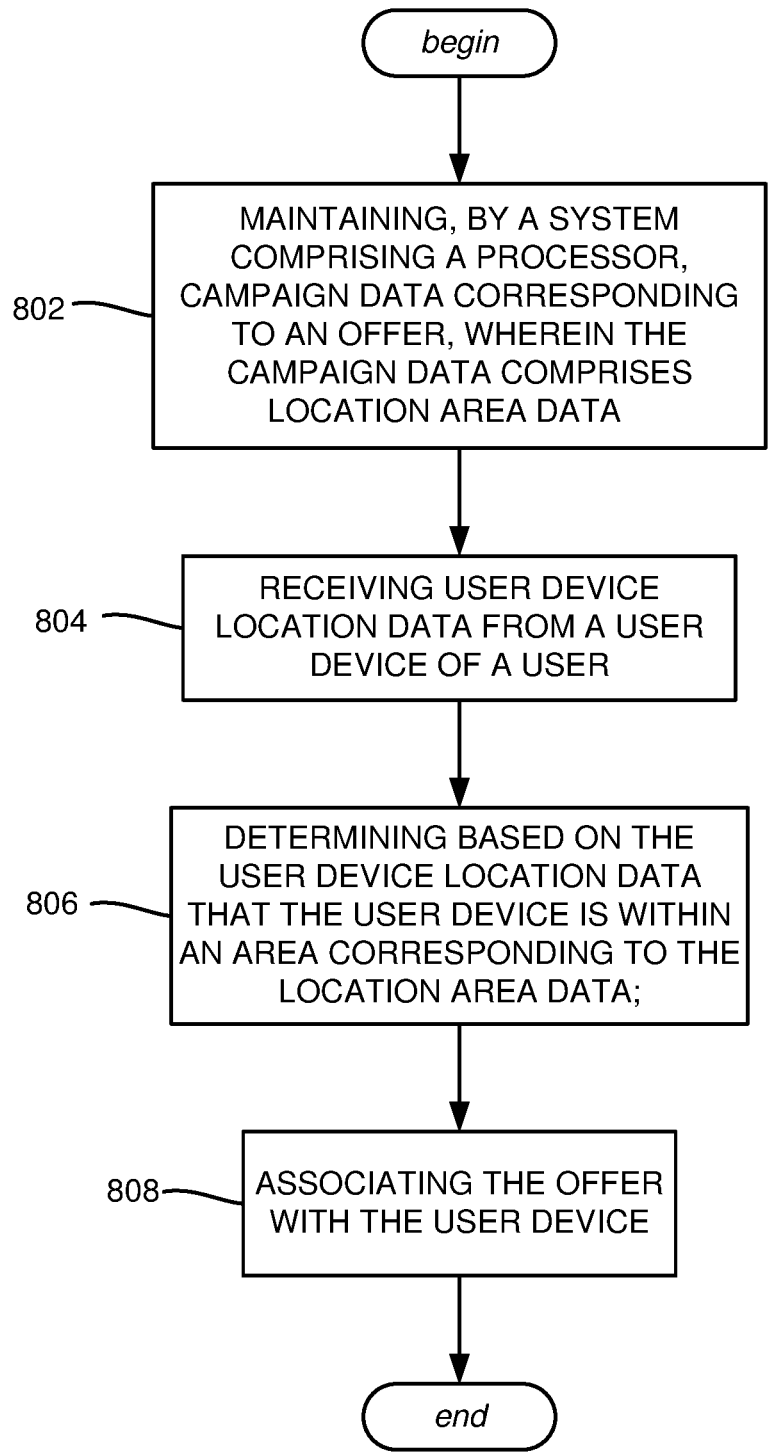
FIG. 8 illustrates example operations of a system that maintains campaign data including for an offer location area and determines that a user device by its location is able to be associated with the offer, in accordance with various aspects and embodiments of the subject disclosure.

One or more example aspects, such as corresponding to example operations of a method, are represented in FIG. 8. Operation 802 represents maintaining, by a system comprising a processor, campaign data corresponding to an offer, wherein the campaign data comprises location area data. Operation 804 represents receiving user device location data from a user device of a user. Operation 806 represents determining based on the user device location data that the user device is within an area corresponding to the location area data. Operation 808 represents associating the offer with the user device.

Associating the offer with the user device can comprise obtaining attach data that attaches the user device to the offer. Aspects can comprise activating the offer at a time specified in the campaign data. The location area data can identify a first location area and a second location area; aspects can comprise distributing the offer as a seed at the first location area and the second location area. Aspects can comprise attaching an incentive to the offer.

Associating the offer with the user device can comprise allowing the user device to clone the offer to propagate the offer to other user devices of other users. Allowing the user to clone the offer to propagate the offer to other users can comprise providing a proximity-based swipe action. Aspects can comprise building a local graph based on the swipe action.

Figure 9:
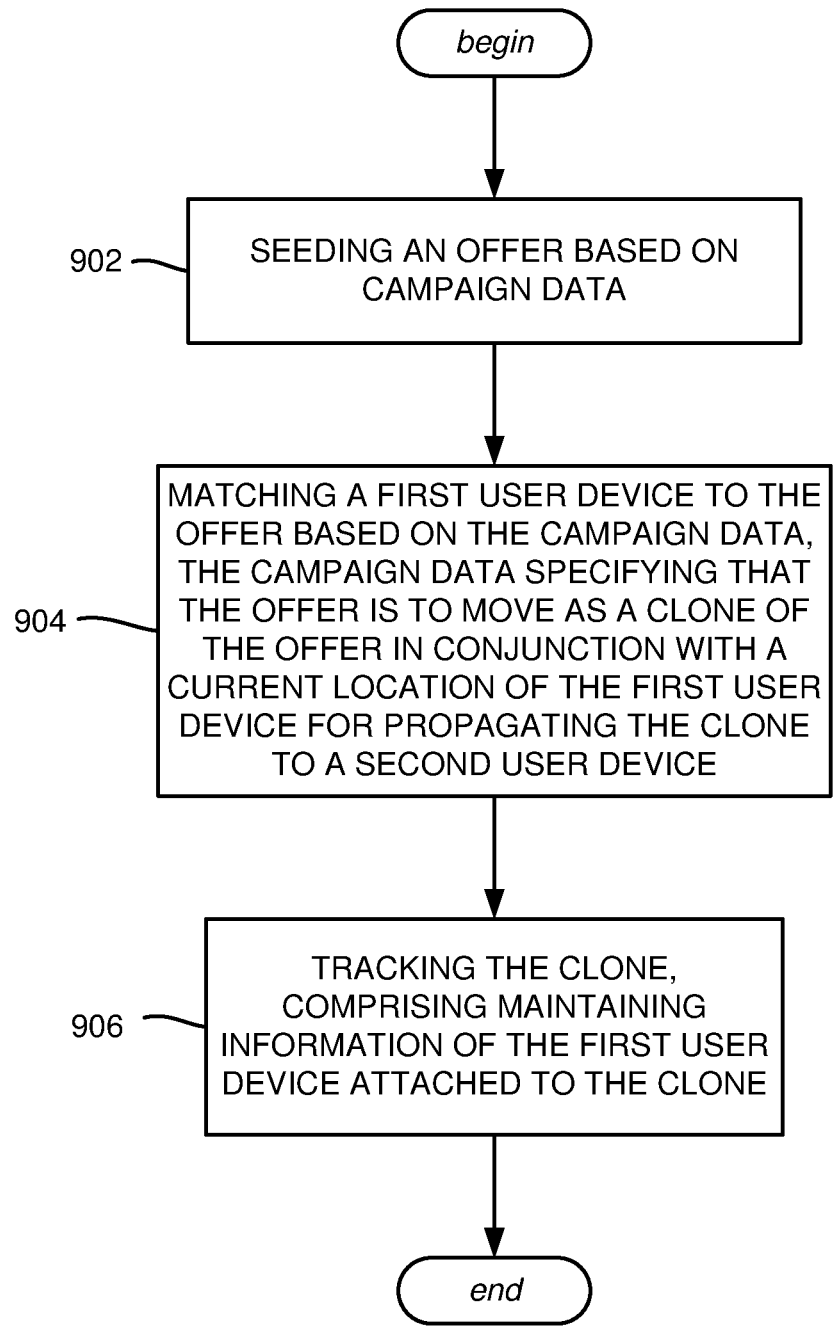
FIG. 9 illustrates example operations seeding an offer based on campaign data to match a user device thereto and cloning the offer, in accordance with various aspects and embodiments of the subject disclosure.

One or more aspects can be embodied in a system, such as represented in FIG. 9, and for example can comprise a memory that stores computer executable components and/or operations that facilitate a user propagated search platform. Operation 902 represents seeding an offer based on campaign data. Operation 904 represents matching a first user device to the offer based on the campaign data, the campaign data specifying that the offer is to move as a clone of the offer in conjunction with a current location of the first user device for propagating the clone to a second user device. Operation 906 represents tracking the clone, comprising maintaining information of the first user device attached to the clone.

The campaign data can specify at least one of one or more locations where the offer is seeded, a lifetime for which the offer exists, incentive model data for user participation and spreading of the offer, one or more spreading options, and/or zone data. The campaign data can specify at least one of a near zone, a middle zone, a far zone, an exclusion zone and/or a geographic zone.

The user propagated local search platform can comprise a ranker that filters and sorts other clones that are attachable to the user device based on a current location of the user device.

Further operations can comprise modifying the clone into a sticky clone that is associated with a location that does not move in conjunction with the current location of the first user device. Further operations can comprise tracking velocity data and direction data of the user device, and limiting propagation of the clone to one or more other user devices based on the velocity data and/or the direction data.

Figure 10:
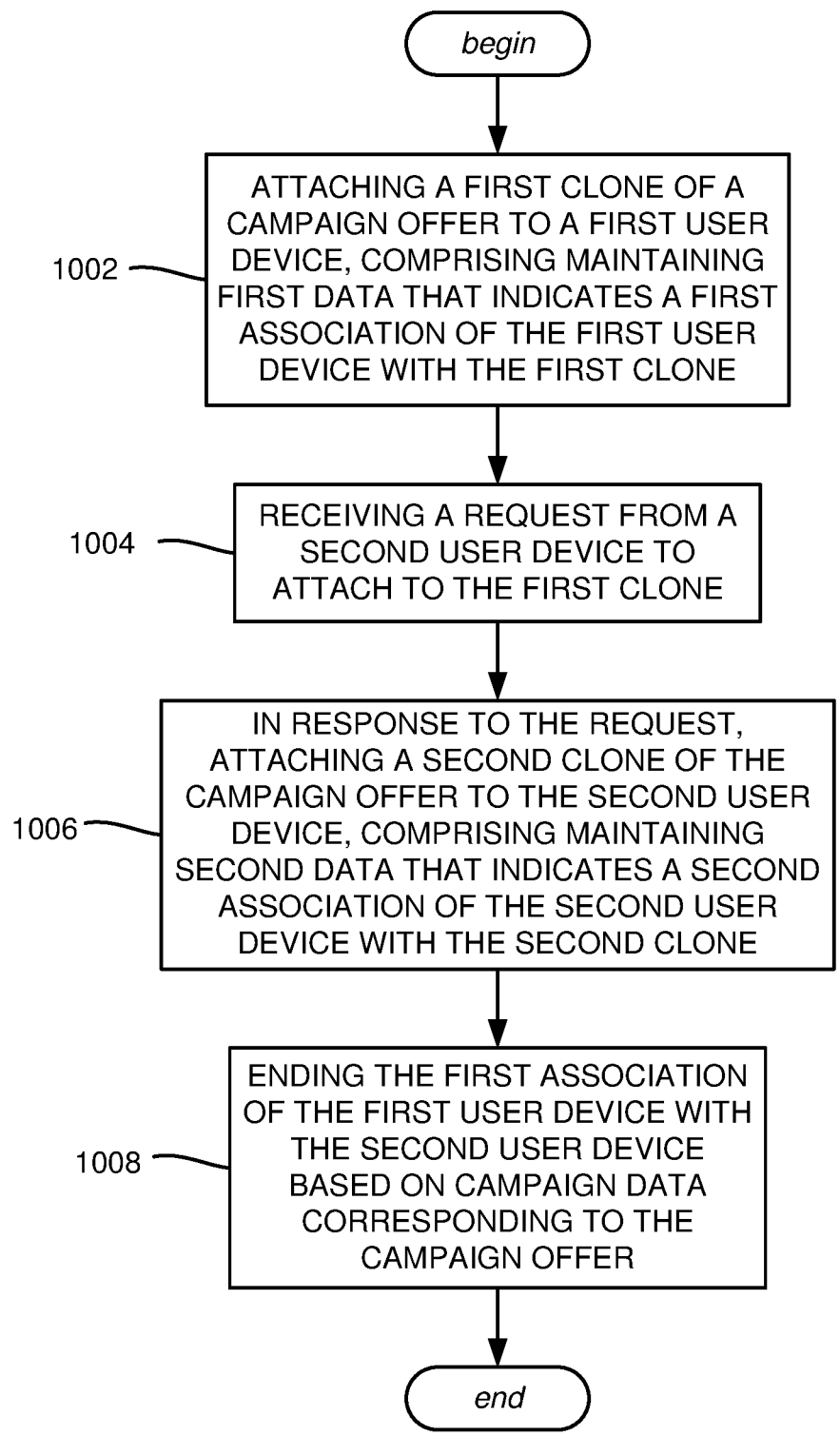
FIG. 10 illustrates example operations for propagating a clone of a campaign, in accordance with various aspects and embodiments of the subject disclosure.

FIG. 10 summarizes various example operations, e.g., corresponding to a machine-readable storage medium, comprising executable instructions that, when executed by a processor, facilitate performance of operations. Operation 1002 represents attaching a first clone of a campaign offer to a first user device, comprising maintaining first data that indicates a first association of the first user device with the first clone. Operation 1004 represents receiving a request from a second user device to attach to the first clone. Operation 1006 represents, in response to the request, attaching a second clone of the campaign offer to the second user device, comprising maintaining second data that indicates a second association of the second user device with the second clone. Operation 1008 represents ending the first association of the first user device with the second user device based on campaign data corresponding to the campaign offer.

Further operations can comprise maintaining, in the campaign data, a seed offer corresponding to a location area, and activating the seed offer at a start time. Ending the first association of the first user device with the first user device based on the campaign data can comprise determining that the first user device is at a location that is not within a location area maintained in the campaign data. Ending the first association of the first user device with the first user device based on the campaign data can comprise determining that the first clone has expired.

Further operations can comprise associating an incentive with the first user device based on incentive information maintained in the campaign data. Further operations can comprise maintaining zone information in the campaign data.

The techniques described herein can be applied to any device or set of devices (machines) capable of running programs and processes. It can be understood, therefore, that servers including physical and/or virtual machines, personal computers, laptops, hand-held, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
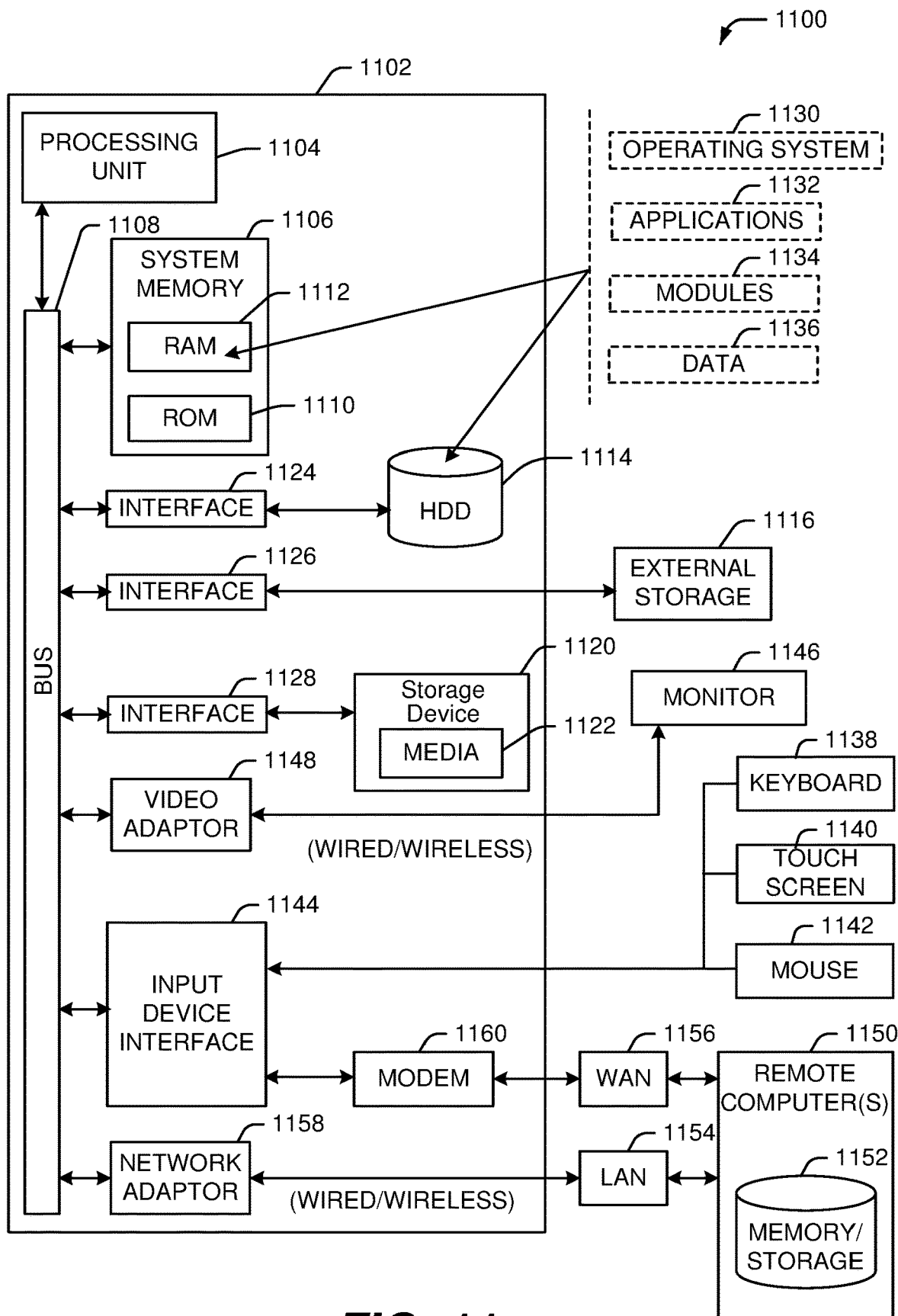
FIG. 11 illustrates an example block diagram of a computer that can be operable to execute processes and methods, in accordance with various aspects and embodiments of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide non-volatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor; and a memory that stores executable instructions which, when executed by the processor, facilitate performance of operations that facilitate a user propagated search platform, the operations comprising:
communicating with one or more mobile client devices, comprising seeding an original offer, based on campaign data, to an application program of an initially seeded mobile client device, wherein the application program provides current location data of the initially seeded mobile client device via the communicating, and wherein the campaign data specifies a specified geographic area, and specifies that the offer is to move as a clone of the original offer in conjunction with a current location of the initially seeded mobile client device for propagating the clone to one or more other user devices within the specified geographic area;
increasing the reach of the campaign offer as the one or more other user devices clone and increase the geographic spread of the offer as the one or more other user devices move;
receiving history data comprising a history of each other client device as each other client device clones the original offer or clones a clone of the original offer; and
tracking velocity data and direction data of the initially seeded mobile client device, and limiting propagation of the clone to the one or more other user devices based on the velocity data or the direction data, or both the velocity data and the direction data.

2. The system of claim 1, wherein the campaign data specifies at least one of: one or more locations where the offer is seeded, a lifetime for which the offer exists, incentive model data for user participation and spreading of the offer, one or more spreading options, or zone data.

3. The system of claim 1, wherein the campaign data specifies at least one of: a near zone, a middle zone, a far zone, an exclusion zone or a geographic zone.

4. The system of claim 1, wherein the user propagated local search platform comprises a ranker that filters and sorts other clones that are attachable to the initially seeded mobile client device based on a current location of the initially seeded mobile client device.

5. The system of claim 1, wherein the operations further comprise modifying the clone into a sticky clone that is associated with a location that does not move in conjunction with the current location of the initially seeded mobile client device.

6. The system of claim 1, wherein the operations further comprise adding sequence data, based on the history of each other client device, to a propagation data structure, to track one or more sequences in which the original offer was cloned.

7. The system of claim 1, wherein the operations further comprise at least one of: activating the offer at a time specified in the campaign data, or maintaining zone information in the campaign data.

8. The system of claim 1, wherein the operations further comprise attaching an incentive to the offer.

9. The system of claim 1, wherein the campaign data further specifies that the initially seeded mobile client device is to stop propagating the offer when the initially seeded mobile client device is no longer within the geographic area.

10. A system, comprising:
a processor; and a memory that stores executable instructions which, when executed by the processor, facilitate performance of operations that facilitate a user propagated search platform, the operations comprising:
seeding an offer based on campaign data;
matching a first user device to the offer based on the campaign data, the campaign data specifying that the offer is to move as a clone of the offer in conjunction with a current location of the first user device for propagating the clone to a second user device;
tracking the clone, comprising maintaining information of the first user device attached to the clone; and
tracking velocity data and direction data of the first user device, and limiting propagation of the clone to one or more other user devices based on the velocity data or the direction data, or both the velocity data and the direction data.

11. The system of claim 10, wherein the campaign data specifies at least one of: one or more locations where the offer is seeded, a lifetime for which the offer exists, incentive model data for user participation and spreading of the offer, one or more spreading options, or zone data.

12. The system of claim 10, wherein the campaign data specifies at least one of: a near zone, a middle zone, a far zone, an exclusion zone or a geographic zone.

13. The system of claim 10, wherein the user propagated local search platform comprises a ranker that filters and sorts other clones that are attachable to the first user device based on a current location of the user device.

14. The system of claim 10, wherein the operations further comprise modifying the clone into a sticky clone that is associated with a location that does not move in conjunction with the current location of the first user device.

15. The system of claim 10, wherein the campaign data specifies at least one of: one or more locations where the offer is seeded, a lifetime for which the offer exists, incentive model data for user participation and spreading of the offer, one or more spreading options, or zone data.

16. The system of claim 10, wherein the user propagated local search platform comprises a ranker that filters and sorts other clones that are attachable to the first user device based on a current location of the user device.

17. A method, comprising:
seeding, by a system comprising a processor, an offer based on campaign data;
matching, by the system, a first user device to the offer based on the campaign data, the campaign data specifying that the offer is to move as a clone of the offer in conjunction with a current location of the first user device for propagating the clone to a second user device;

tracking the clone, by the system, comprising maintaining information of the first user device attached to the clone; and tracking, by the system, velocity data and direction data of the first user device, and limiting propagation of the clone to one or more other user devices based on the velocity data or the direction data, or both the velocity data and the direction data.

18. The method of claim 17, further comprising modifying, by the system, the clone into a sticky clone that is associated with a location that does not move in conjunction with the current location of the first user device.

19. The method of claim 17, further comprising adding sequence data, based on the history of each other client device, to a propagation data structure, to track one or more sequences in which the original offer was cloned.

20. The method of claim 17, further comprising at least one of: activating the offer at a time specified in the campaign data, or maintaining zone information in the campaign data.

* * * * *